Patented Sept. 26, 1939

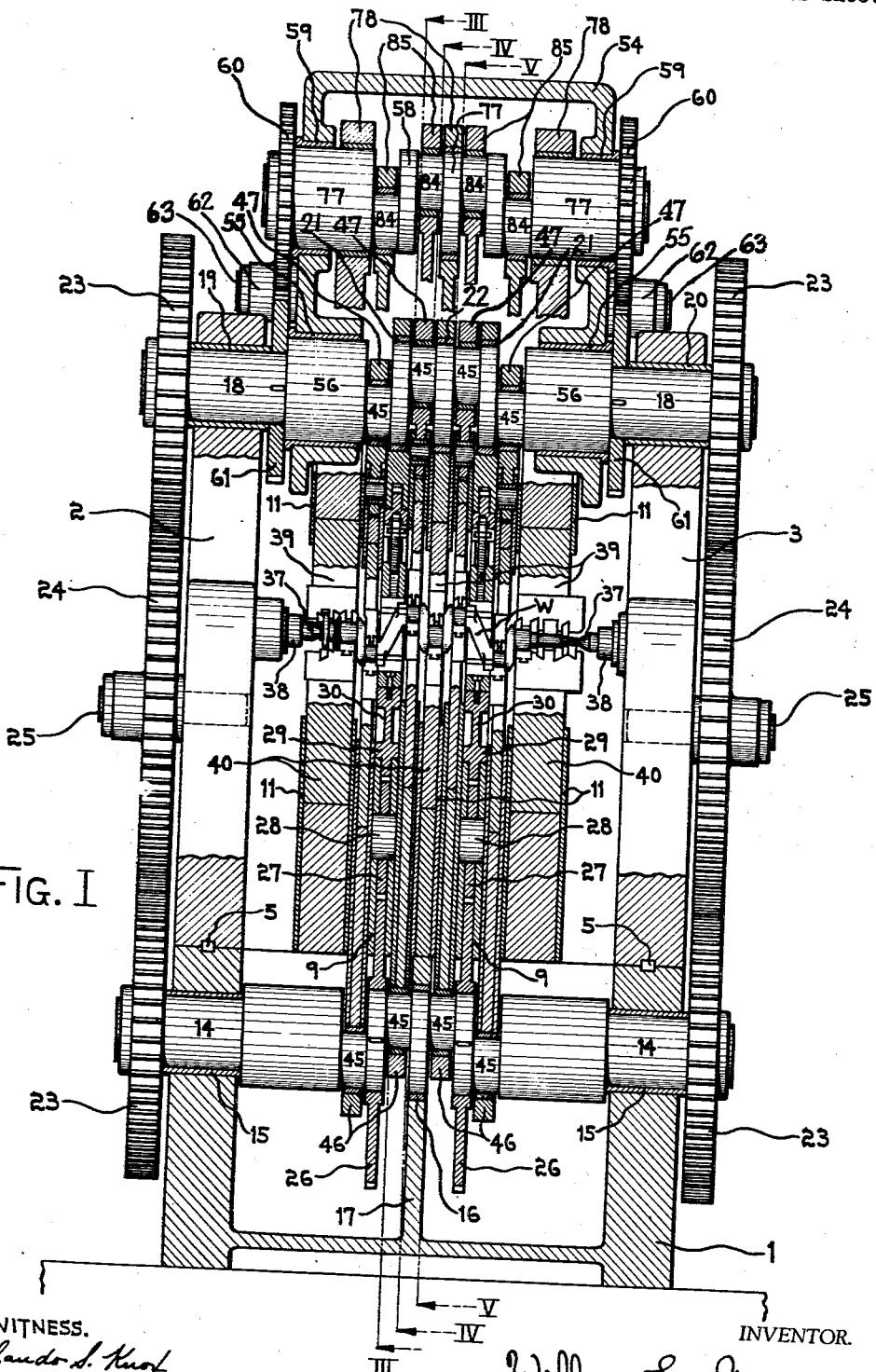
FIG. I

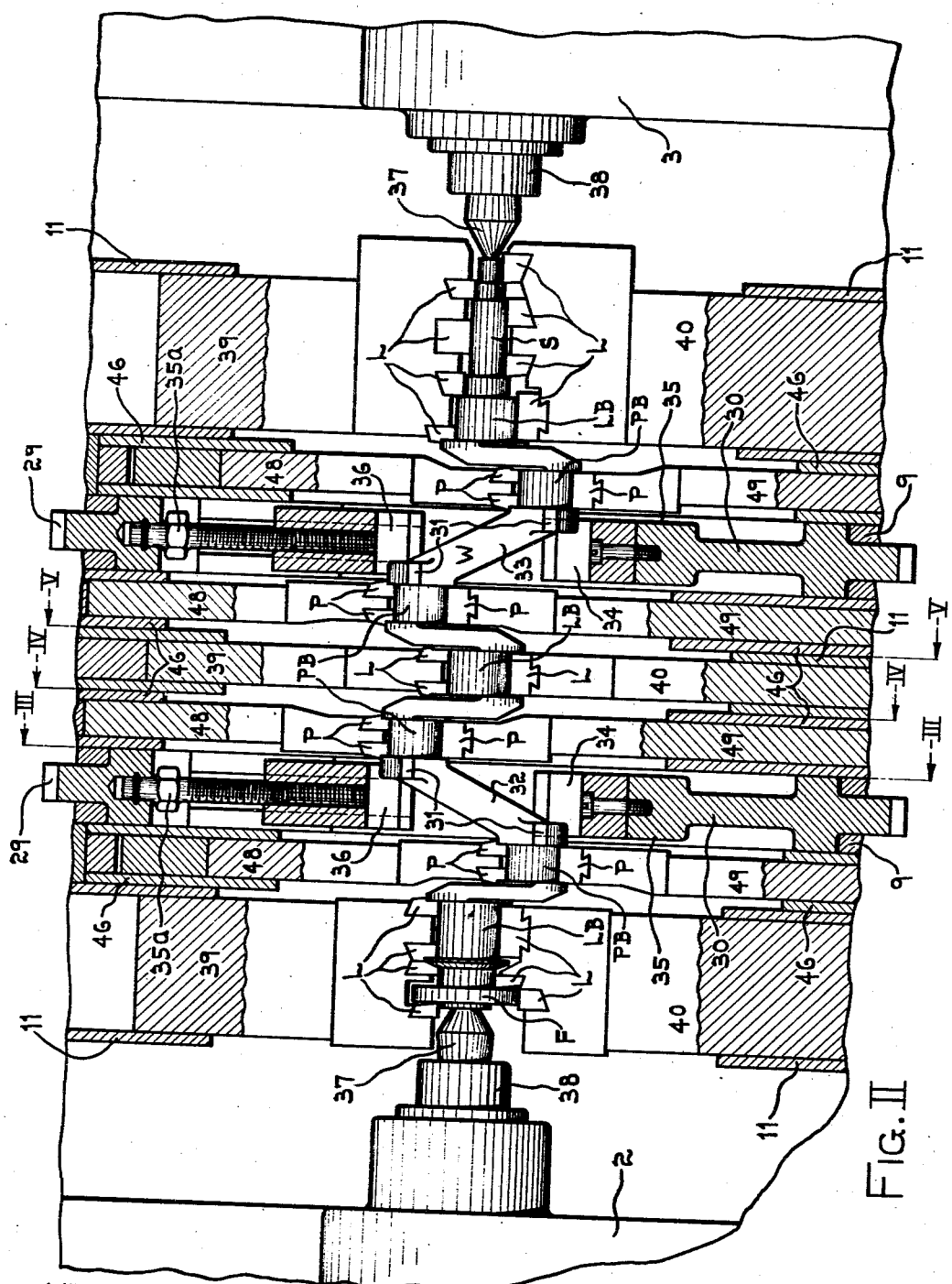

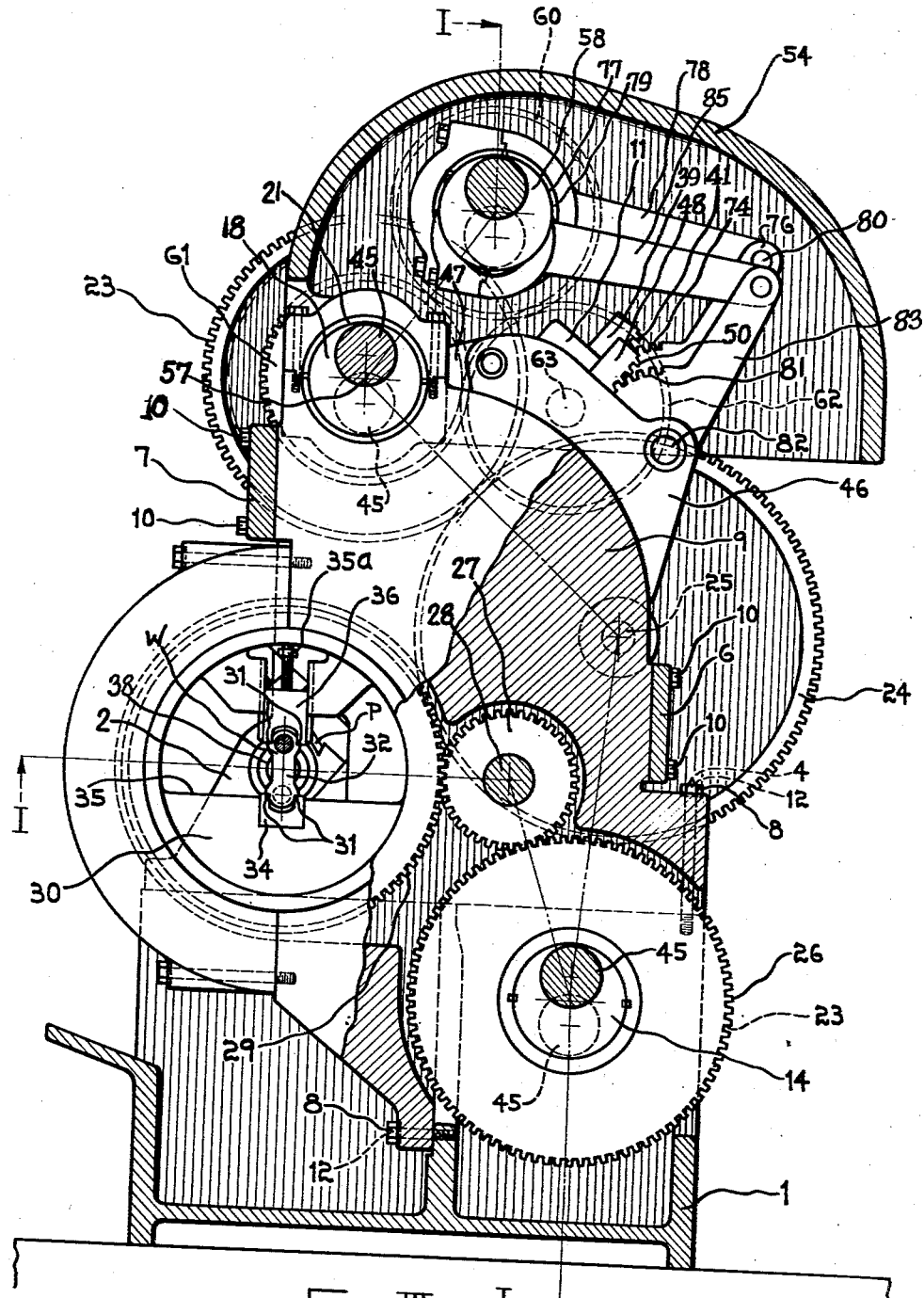

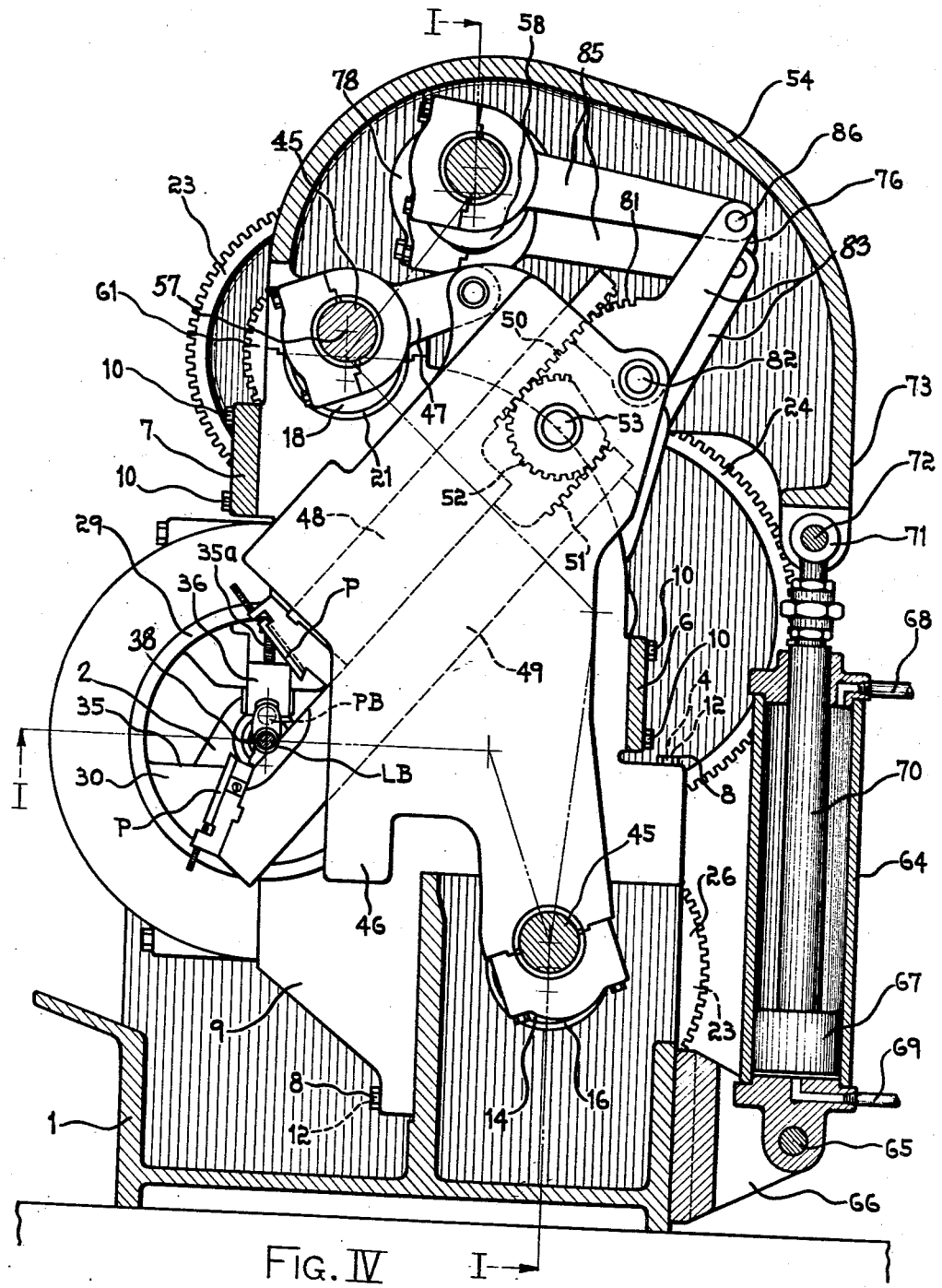

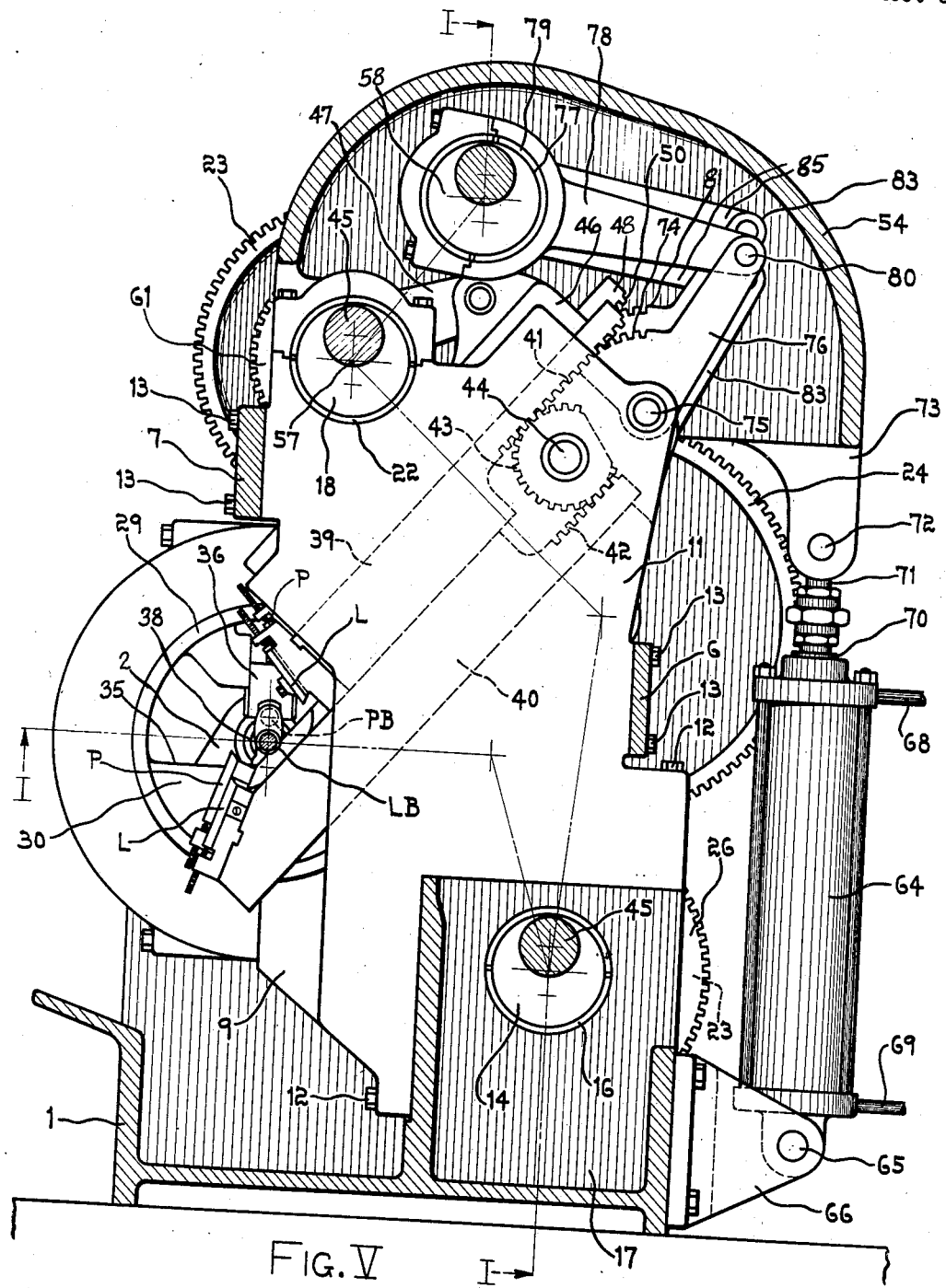
Fig. V

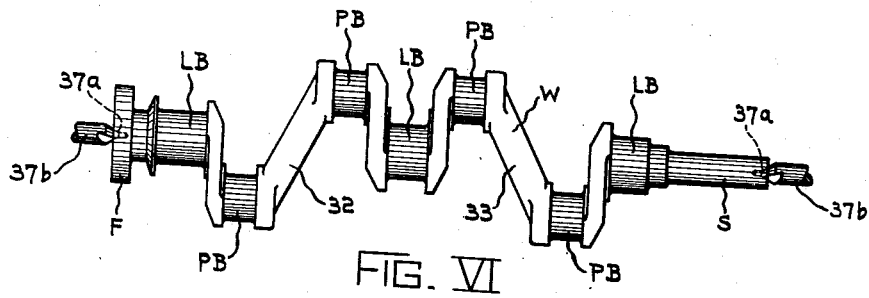
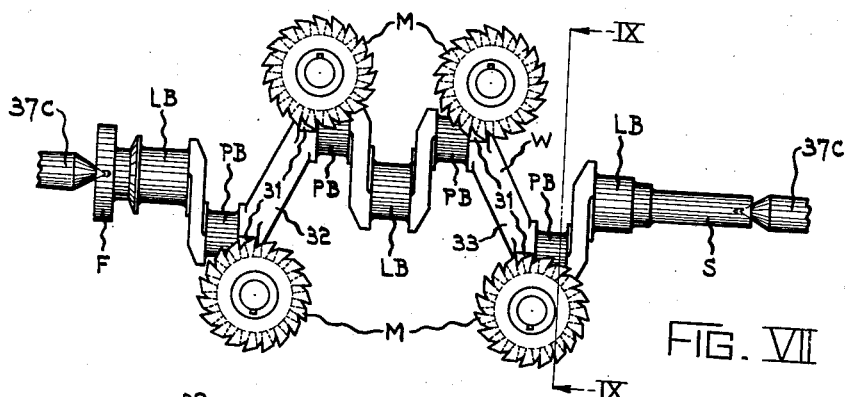
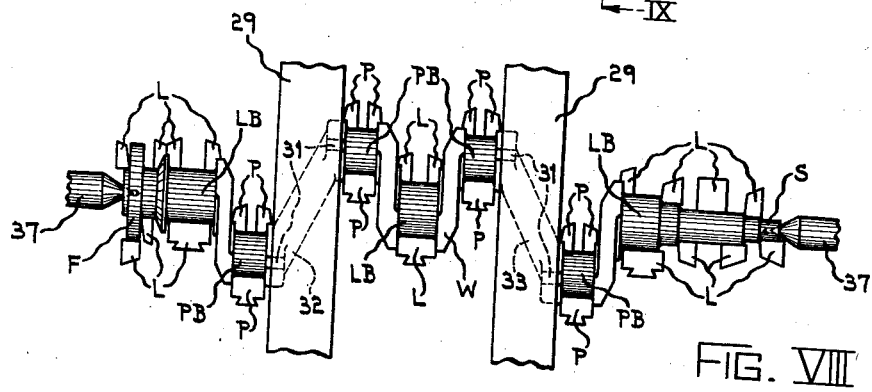
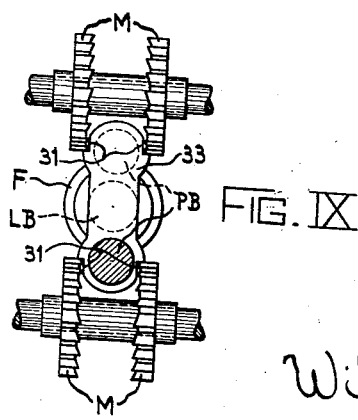

2,174,083

UNITED STATES PATENT OFFICE 2,174,083

CRANKSHAFT LATHE

Willard L. Groene, Cincinnati, Ohio, assignor to The R. K. Le Blond Machine Tool Company, Cincinnati, Ohio, a corporation of Delaware Application December 3, 1937, Serial No. 177,953

39 Claims. (Cl. 82—9)

This invention pertains to crankshaft lathes, and more particularly to such types of lathes which are adapted to turning the bearing portions of crankshafts. More particularly this lathe is adapted to turn all of the line bearings, including the flange and stub end portions, and all of the pin bearings simultaneously in a single machining operation.

Heretofore, in machining these bearing portions on a crankshaft, the procedure has been substantially as follows: The rough crankshaft forging was first centered in its ends and suitable machined locating areas provided on its webs for chucking in a lathe. The crankshaft forging so prepared was then placed in what is known as a center drive line bearing lathe of a character, for example, as shown in Patent No. 2,069,107 issued January 26, 1937, wherein all of the line bearings, including the flange and stub ends, were machined. It was next necessary to straighten the crankshaft after removal from said center drive line bearing lathe because the crankshaft when unchucked would spring due to the metal being removed by the turning of the line bearings so that these line bearing portions of the crankshaft would not run true for subsequent accurate machining operations on these line bearing portions. After the crankshaft had been thus straightened so that the line bearing portions ran approximately true, it was next necessary to accurately machine these portions, particularly the line bearing diameters, very accurately either by rough grinding them or by finish turning them in a lathe of a character set forth in co-pending application Serial Number 80,204 filed May 16, 1936. This finishing operation on the line bearing portions was necessary before the crankshaft was in a condition where it could be inserted in a pin turning lathe for machining the crankpins of the crankshaft. After being so prepared the crankshaft was then placed in an orbital pin turning lathe, for example, of a character set forth in co-pending application Serial No. 122,349 filed January 26, 1937, wherein the webs adjacent the crankpin were cheeked and then the crankshaft was removed to another similar lathe wherein all of the crankpins were turned. Thus in the past and prior to my invention the following operations were required to completely machine all of the bearing portions of a crankshaft: First: Center and prepare the locating areas on the rough crankshaft forging. Second: Turn all of the line bearings, flange and stub ends in a center drive lathe. Third: Straighten the crankshaft for finish machining line bearings. Fourth: Finish turn or finish grind said line bearings. Fifth: Place crankshaft in the orbital lathe and machine the cheeks of the webs adjacent the crankpin. Sixth: Place the crankshaft in another orbital lathe and complete the turning of the crankpin. This former method, which I have just described, is obviously very inefficient because of the large number of operations required to complete the bearing portions on the shaft and also because of the lack of accuracy which can be obtained with a method of this type wherein accumulated errors in the machining operations become quite extensive due to the many handlings and different types of machines utilized to complete the work. With these difficulties and the multitude of unfavorable circumstances which go with this former type method clearly in mind, I conceived the idea of a lathe wherein all of these operations, after the first above mentioned operation has been performed, could be combined into a single machining operation to accomplish the machining of all of the line bearings, including the flange and stub ends, and all of the pin bearings of a crankshaft.

An object of my invention is to provide a lathe wherein a crankshaft may be placed and during the operation of the lathe, all of the line bearings, including the flange and stub ends, and all of the pin bearings are simultaneously machined in a single operation.

Another object of my invention is to provide in a lathe means for chucking and rotating a crankshaft intermediate its ends and tool means adapted to machine simultaneously all of the line bearings, including the flange and stub ends, and all of the pin bearings of said crankshaft during the rotation of said crankshaft by said chucking and rotating means.

Another object is to provide a center drive crankshaft lathe in which are incorporated cutting tools adapted to simultaneously machine all of the line bearings, including the flange and stub ends, and all of the pin bearings of said crankshaft in the lathe.

And still another object of my invention is to provide a lathe having a center drive chuck adapted to support and rotate a crankshaft intermediate its ends and to provide tool means each side of said center drive chuck some adapted to machine the line bearings of said crankshaft while others of said tool units are adapted to machine the pin bearings of said crankshaft simultaneously in a single operation.

It is also my intention to provide a lathe having a plurality of center drive chucking devices adapted to grip and support and to rotate a crankshaft intermediate its ends and to provide in such a lathe tool means each side of said center drive chuck and between said center drive chucks adapted to simultaneously machine both the line bearing portions and the pin bearing portions of said crankshaft in a single operation.

And still another object of my invention is to provide a center drive crankshaft lathe wherein there are both stationary and orbitally moving tool carrier units having tools which may be fed to the crankshaft for simultaneously machining all of the line bearings, including the flange and stub ends, and all of the pin bearings of said crankshaft in a single machining operation.

Further objects of the invention will appear from the detailed description of the drawings in which:

Figure I is a diagramatic sectional view of the lathe substantially on the lines I—I of Figures III, IV and V.

Figure II is an enlarged portion of Figure I particularly showing the application of the cutting tools to the line bearing, the flange and stub ends, and the pin bearings of a crankshaft.

Figure III is a vertical transverse section through the lathe on the line III—III of Figures I and II.

Figure IV is a vertical transverse section through the lathe on the line IV—IV of Figures I and II.

Figure V is a vertical transverse section through the lathe on the line V—V of Figures I and II.

Figure VI is a diagrammatic view showing the centering of the ends of the rough crankshaft forging.

Figure VII is a diagrammatic view showing the milling of the locating areas on the webs of the rough crankshaft forging.

Figure VIII is a diagrammatic view showing the cutting tools applied to simultaneously machine all of the bearing portions of the crankshaft.

Figure IX is a transverse section through the crankshaft on the line IX—IX of Figure VII.

The lathe comprises a base I upon the ends of which are mounted upright housings 2 and 3 and bolted in place thereon by suitable bolts 4 and accurately located on the top of the base by keys 5. The housings 2 and 3 are tied together at the rear by a tie bar 6 and, also, are tied together at the front at their upper portion by a tie bar 7 appropriately bolted to faces on the housings. Also fixed on the base I of the lathe by appropriate screws 8 are the center drive ring gear chuck housings 9, as best shown in Figure III. These housings 9 are, also, secured to the tie bars 6 and 7 by appropriate bolts 10.

Also on the base of the lathe are mounted the line bearing tool units II which are secured to the base by appropriate bolts 12 and, also, to the tie bars 6 and 7 by appropriate bolts 13. These line bearing tool units are best shown in Figure V.

In the base I of the lathe is journaled the lower master crankshaft 14 in suitable bearings 15 and is supported at its center in a bearing 16 carried in a rib 17 of the base I. An upper master crankshaft 18 is journaled in bearings 19 and 20 carried in the upper end of the respective housings 2 and 3. This upper master crankshaft is, also, supported in bearings 21 in the upper ends of the center drive chuck units 9 and in a bearing 22 carried in the center line bearing tool unit II. On each end of these master crankshafts 14 and 18 are mounted identical gears 23 which engage idler gears 24 carried on appropriate studs 25 fixed in the outer faces of the housings 2 and 3 as best shown in Figure I. By this arrangement the upper and lower master cranks are caused to rotate in exact synchronism. On the lower master crankshaft 14, where it passes through the center drive chuck units, are fixed gears 26 having the same identical pitch and number of teeth as the gears 23 mounted on the end of the master crankshafts 14 and 18. These gears 26 are adapted to drive idler gears 27 which are journaled on studs 28 carried in the center drive chuck unit 9, and which idler gears in turn drive the ring gears 29 of the center drive ring gear chucking devices indicated generally at 30. The gear 29 of the ring gear chucking device is, also, identical as to pitch and number of teeth as the gears 26 so that these ring gears will thus be rotated in exact synchronism with both of the master crankshafts 14 and 18.

The center drive ring gear chucking device may comprise any suitable device for gripping the crankshaft intermediate its ends, preferably a device of the character set forth in Patent 2,030,020 issued February 4, 1936, wherein the crankshaft W may be supported and rotated by means of machined locating areas 31 formed on the webs 32 and 33 of the crankshaft. In the exemplary disclosure here shown a U shaped locating block 34 is fixed to the web 35 of the ring gear 29 and engages two sets of the locating faces 31. On the other side of the axis from the locating block 34 is provided an adjustable locating block 36 which engages another set of the machined locating surfaces 31 when the clamping screw 35a is appropriately operated for tightening the adjustable block 36 down against the crankshaft web and the locating areas 31 in a manner set forth in the Patent 2,030,020 cited.

The ends of the crankshaft are supported on the usual centers 37 which are mounted in axially adjustable sleeves 38 carried in the housings 2 and 3.

The line bearing tool units II (Figure V) carry tool bars 39 and 40 which have racks 41 and 42 respectively at their upper rear ends which racks are interconnected through a segmental pinion 43 carried on a stud 44 fixed in the unit II, so that they may be reciprocated in opposite directions for bringing the tools L to and from the work from opposite sides, as best seen in Figure II. The tools L are adapted to simultaneously machine all of the line bearings LB, including the flange end F and the stud end S, on the crankshaft W.

On the pins 45 of the master crankshafts 14 and 18 are mounted the pin bearing tool units 46 (Figure IV) by means of the linkage connection 47 in a manner set forth in Patent Reissue 18,662 issued November 22, 1932. In these pin units 46 are mounted tool bars 48 and 49 which have the respective racks 50 and 51 at their upper rear ends, which racks are interconnected by means of the segmental pinion 52 carried on a stud 53 fixed in the units 46 so that each of the tool bars 48 and 49 may be reciprocated in opposite directions for moving the tools P to and from the work from opposite directions. As can best be seen in Figure II the tools P are adapted to simultaneously machine all of the pin bearings PB of the crankshaft W at one time. The tools P are caused to properly follow their respective crankpins by the synchronized rotation of the master crankshafts 14 and 18 and the center drive chucking devices 30 through the gearing described.

The mechanism for simultaneously feeding all of the tool bars 39 and 40 in the line bearing units 11 and the tool bars 48 and 49 in the pin bearing units 46 comprises a cradle 54 which is pivotally mounted by bearings 55 about line bearing surfaces 56 of the upper master crankshaft 18 so that it pivots about the center of rotation 57 of said upper master crankshaft. Journaled in the cradle 54 is a master feed crankshaft 58 in suitable bearings 59 and having gears 60 on each of its outward projecting ends. On the upper master crankshaft 18 between the housings 2 and 3 and adjacent the bearings 19 and 20 for the upper master crankshaft are fixed gears 61 having the identical pitch and number of teeth as the gears 60, the gears 61 driving the gears 60 through idler gears 62 journaled on studs 63 carried by the cradle 54 so that the feed crankshaft 58 is at all times driven in synchronism with the master crankshafts 14 and 18 and through the gearing described the center drive ring gear chucking devices 30. The cradle 54 is rocked about its pivot 57 by means of an appropriate hydraulic feed cylinder 64 mounted on a pivot pin 65 carried in a bracket 66 fixed to the rear of the base 1 of the lathe. A piston 67 is mounted in the cylinder 64 and is adapted to be reciprocated up and down by applying fluid pressure through the line 68 and 69. To the piston is connected the piston rod 70 which is connected by an eye-bolt connection 71 to a pivot pin 72 carried in the rear downwardly extending portion 73 of the cradle 54 so that when fluid pressure is applied through the line 69 to cause the piston 67 and the rod 70 to be forced upwardly, the rear of the cradle is rocked upwardly which causes the cradle to pivot around its pivot axis 57 and thus cause the feed crankshaft 58 to swing upwardly and forwardly about the upper master crankshaft 18. And likewise by applying fluid pressure to the line 68 to return the piston 67 and its rod 70 downward, the cradle is rocked backwardly and downwardly to return the feed crankshaft 58 to the position shown in Figures III, IV and V. This swinging movement imparted to the feed crankshaft 58 is applied to actuating the various tool bars 39 and 40, and 48 and 49 as follows: Referring to Figures I and V, to the rear upward portion of each of the line bearing tool units 11 is pivotally mounted a segmental gear 74 pivotally mounted on a pin 75 fixed in the units 11 and having an integral upwardly projecting lever arm 76. About the line bearing portions 77 of the master feed crankshaft 58 are journaled the links 78 by suitable bearings 79 which links project rearwardly and are pivotally mounted to the upper ends of the lever arm 76 by an appropriate pin 80. It will thus be seen that when the feed crankshaft 58 is rocked forward or counterclockwise, as seen in Figure V, that the lever arm 76 of the segmental gear 74, which engages the rack 41 of the tool bars 39, will likewise be rocked counterclockwise and will thus cause the tool bars 39 to move toward the work and through the segmental pinions 43, the tool bars 40 will be likewise moved toward the work from the opposite direction.

On each of the pin turning units 46 is pivotally mounted the segmental gear 81 on a pin 82 fixed in the units and which gear engages the racks 50 on the tool bars 48 in said units. The segmental gear 81 has an upwardly projecting integral lever arm 83 similar to the lever arm 76 of the line bearing units 11. About the crankpins 84 of the feed crankshaft 58 are mounted the links 85 which project rearwardly and connect through the pivotal connection comprising the pin 86 with the upper end of the lever arm 83 of the segmental gear 81 so that as the feed crankshaft 58 is run forward these levers 83 will be rocked forward or counterclockwise to cause feeding of the tool bars 48 and 49 through the segmental pinions 52 to bring the pin turning tools P from opposite direction toward the crankshaft as described. Since the feed crankshaft is at all times kept synchronized with the rotation of the master crankshafts 14 and 18 through the gearing described, the relationship of the links 85 to the orbitally moving pin turning unit 46 will at all times remain constant and in the same relative position as the links 78 bear to their line bearing units 11 so that the orbital movement of these pin units 46 will have no effect in destroying a constant and uniform feeding motion to their respective tool bars 48 and 49. Thus, by this arrangement a single feeding means is provided for simultaneously feeding all of the tool bars of the line bearing units and of the pin bearing units for simultaneously applying tools to the crankshafts to machine all of the line bearings, including the flange and stub ends, and all of the pin bearings.

Fluid pressure for operating the feed cylinder 64 may be driven from any suitable fluid pressure pump which is usually driven by an electric motor. The power for rotating the center drive chucks and the master crankshafts may be derived from a suitable electric motor which may be geared to any one or several of the gears 23 located on the master crankshafts 14 and 18 as is usual for lathes of this type.

It is to be clearly noted, in referring to Figure II, that in this embodiment tools are provided to approach and retract from the work from both sides whereby it is highly practical to completely machine every portion of the crankshaft to be turned. By use of tools approaching the work from both sides the cutting forces are balanced and reduced substantially to a torque reaction in the work rather than to an axial displacement as the tools are fed towards it. This makes practical the turning of all of the line bearings, including the flange and stub ends, and all of the pin bearings at one time which operation obviously requires considerable power and imparts considerable strain to a work piece of a character of a crankshaft. Also by utilization of tools cutting from both sides sufficient tooling can be provided for completing all of the machining operations at one time. More specifically, the tooling of this arrangement is adapted to not only turn and form all of the bearing surfaces but also is adapted to cheek and fillet the web portions of the crankshaft a procedure not as well adapted to a lathe in which cutting tools are provided only on one side of the work piece.

Noting particularly the diagrammatic Figures VI, VII, VIII, and IX, in Figure VI is represented the rough crankshaft forging having its center holes 37a bored in the ends by appropriate center drills 37b to receive the centers 37 of the center drive lathe and for the centers 37c of the milling machine for cutting the locating areas 31 as shown in Figures VII and IX. Here the milling cutters M machine these locating areas 31 in a definite relation to the axis of rotation of the crankshaft as established by the center holes prepared in Figure VI. Figure VIII completes the diagrammatic showing of the steps of this process and is the same as the showing in Figure II except that all detailed mechanism has been dispensed with to more clearly show the method of supporting and rotating the crankshaft and applying the cutting tools to simultaneously machine all of the bearing surfaces on the shaft simultaneously.

Having thus described my invention, what I claim as new and desire to secure by United States Letters Patent is:

1. In a lathe, a rotatable work holder, a tool holder movable relative to a concentric portion of a work piece in said work holder, a tool holder movable relative to an eccentric portion of said work piece, means for moving said second mentioned tool holder in an orbital path which is a replica of the path of travel defined by the axis of said eccentric portion of said work piece when rotated by said work holder, means for rotating said work holder, and means for feeding said tool holders.

2. In a lathe, a rotatable work holder, a tool holder movable relative to a concentric portion of a work piece in said work holder, a tool holder movable relative to an eccentric portion of said work piece, means for moving said second mentioned tool holder in an orbital path which is a replica of the path of travel defined by the axis of said eccentric portion of said work piece when rotated by said work holder, means for rotating said work holder, and common means for simultaneously feeding both of said tool holders.

3. In a lathe, a rotatable work holder, a tool holder movable relative to a plurality of concentric portions of a work piece in said work holder, a plurality of tool holders movable relative to a plurality of eccentric portions of said work piece, means for moving said second mentioned tool holders in orbital paths which are replicas of the paths of travel defined by the axes of said eccentric portions of said work piece when rotated by said work holder, means for rotating said work holder, and means for feeding said tool holders.

4. In a lathe, a rotatable work holder, a plurality of tool holders movable relative to concentric portions of a work piece in said work holder, a plurality of tool holders movable relative to a plurality of angularly disposed eccentric portions of said work piece, means for moving said second mentioned tool holders in orbital paths which are replicas of the paths of travel defined by the axes of said eccentric portions of said work piece when rotated by said work holder, means for rotating said work holder, and means for feeding said tool holders.

5. In a lathe, a rotatable work holder, a plurality of tool holders movable relative to a plurality of axially spaced concentric portions of a work piece in said work holder, a plurality of tool holders movable relative to a plurality of axially spaced eccentric portions of said work piece, means for moving said second mentioned tool holders in orbital paths which are replicas of the paths of travel defined by the axes of said eccentric portions of said work piece when rotated by said work holder, means for rotating said work holder, and means for feeding said tool holders.

6. In a lathe, means for rotating a work piece intermediate its ends, a tool holder movable relative to a concentric portion of a work piece in said means, a tool holder movable relative to an eccentric portion of said work piece, means for moving said second mentioned tool holder in a circular path following said eccentric portion, means for operating said first mentioned means, and means for feeding said tool holders.

7. In a lathe, means for supporting and rotating a work piece intermediate its ends, a tool holder movable relative to a concentric portion of a work piece in said means, a tool holder movable relative to an eccentric portion of said work piece, means for moving said second mentioned tool holder in a circular path following said eccentric portion, means for operating said supporting and rotating means, and means for feeding said tool holders.

8. In a lathe, a plurality of means for rotating a work piece spaced apart along said work piece, a tool holder movable relative to a concentric portion of a work piece in the lathe, a tool holder movable relative to an eccentric portion of said work piece, means for moving said second mentioned tool holder in a circular path following said eccentric portion, means for rotating said first mentioned means, and means for feeding said tool holders.

9. In a lathe, means for supporting and rotating a work piece intermediate its ends and at a plurality of axially spaced positions along the work piece, a tool holder movable relative to a concentric portion of said work piece in said means, a tool holder movable relative to an eccentric portion of said work piece, means for moving said second mentioned tool holder in an orbital path, means for rotating said supporting and driving means in synchronism, and means for feeding said tool holders.

10. In a lathe, means for supporting and rotating a work piece intermediate its ends and at a plurality of axially spaced positions along said work piece, tool holders movable relative to concentric portions of the work piece in said means, tool holders movable relative to eccentric portions of said work piece, means for moving said second mentioned tool holders in orbital paths, means for rotating said supporting and rotating means in synchronism, and means for feeding all of said tool holders simultaneously relative to said work piece.

11. In a lathe, means for supporting and rotating a work piece intermediate its ends and at a plurality of axially spaced positions along said work piece, tool feeding devices operable each side of and between said means for feeding tools relative to concentric portions on said work piece in said means, tool feeding devices operable each side of and between said means for feeding tools relative to eccentric portions on said work piece, means for actuating said second mentioned tool feeding devices in orbital movement, means for rotating said supporting and rotating means in synchronism, and means for simultaneously feeding all of said tool feeding devices relative to said work piece.

12. In a lathe, means for supporting and rotating a work piece intermediate its ends, means for supporting the ends of said work piece, tool feeding devices operable to feed tools relative to concentric portions of said work piece, located between said supporting and rotating means and said means for supporting the ends of said work piece, tool feeding devices operable to feed appropriate tools for machining eccentric portions on a work piece in said lathe also located between said supporting and rotating means and the supporting means for the ends of said work piece, means for actuating said supporting and rotating means, means synchronized with the rotation of said supporting and rotating means for moving said second mentioned tool feeding devices in orbital movement, and means for simultaneously feeding all of said tool feeding devices.

13. In a crankshaft lathe, means for rotating a crankshaft on its line bearing axis, a tool feeding device operable to feed a cutting tool relative to a line bearing portion of said crankshaft, a tool feeding device operable to feed a cutting tool relative to a crank pin portion of said crankshaft, means for moving said second mentioned tool feeding device in orbital movement to cause the cutting edge of a cutting tool mounted thereon to follow an orbital path which is a replica of the path described by the axis of the crank pin portion, means for synchronizing the movement of said work holder and said orbitally moving tool feeding device, and means for feeding said tool feeding device relative to said work piece.

14. In a crankshaft lathe, means for supporting and rotating a crankshaft solely by means of its ends and webs so as to expose all of its line bearings, including the flange and stub ends and all of its pin bearings, tool feeding devices operable to feed appropriate tools for machining all of the line bearings, including the flange and stub ends of said crankshaft, tool feeding devices operable to feed appropriate tools for machining all of the pin bearings of said crankshaft, means for moving said second mentioned tool feeding devices in circular orbital movement, and means for feeding said tool feeding devices relative to said crankshaft.

15. In a crankshaft lathe, means for supporting and rotating a crankshaft intermediate its ends by means of its webs so as to expose all of its line bearings, flange and stub ends, and all of its pin bearings, tool feeding devices operable to feed appropriate tools for machining all of said line bearings, flange and stub ends, tool feeding devices operable to feed appropriate tools for machining all of said pin bearings of said crankshaft, means for moving said second mentioned tool feeding devices in circular orbital movement, and common tool feeding means for simultaneously operating all of said tool feeding devices.

16. In a crankshaft lathe, means for chucking and rotating a crankshaft intermediate its ends, means for supporting the ends of said crankshaft, tool feeding devices operable each side of said chucking and rotating means and between said means for supporting the ends of said crankshaft adapted to machine all the line bearing and pin bearing portions of said crankshaft, means for actuating some of said tool feeding devices in orbital movement, means for synchronizing the rotation of said chucking and rotating means with the orbital movement of some of said tool feeding devices, and means for simultaneously feeding all of said tool feeding devices relative to said crankshaft.

17. In a center drive crankshaft lathe, means for supporting and rotating a crankshaft intermediate its ends, centers for supporting the ends of said crankshaft, tool feeding devices operable each side of said supporting and rotating means and between said centers adapted to feed appropriate tools for machining the line bearing portions and the pin bearing portions of said crankshaft, means for moving some of said tool feeding devices in orbital movement, means synchronizing the rotation of said orbitally moving tool feeding devices with the rotation of said supporting and rotating means for the crankshaft, and common tool feeding means for simultaneously feeding all of said tool feeding devices so as to cause said tools to feed relative to the line bearing and pin bearing portions of said crankshaft from opposite sides of said crankshaft.

18. In a crankshaft lathe, a plurality of center drive chucking devices adapted to engage axially spaced webs of a crankshaft in said lathe, tool feeding devices located between said chucking devices and each side thereof adapted to feed appropriate tools for machining all of the line bearing portions of said crankshaft, tool feeding devices located between said center drive chucking devices and each side thereof adapted to feed appropriate tools for machining all of the pin bearing portions of said crankshaft, means for moving said second mentioned tool feeding devices in orbital movement synchronized with the rotation of said center drive chucking devices, and common means for simultaneously feeding all of said tool feeding devices relative to said bearings of said crankshaft.

19. In a center drive crankshaft lathe, a plurality of center drive chucking devices adapted to engage axially spaced webs of a crankshaft in said lathe, centers for supporting the ends of said crankshaft, tool feeding devices operable between said center drive chucking devices and between said devices and said centers for feeding appropriate tools for machining all of the line bearing portions of said crankshaft, tool feeding devices operable between said center drive chucking devices and between said devices and said centers for machining all of the pin bearing portions of said crankshaft, means for moving said last mentioned tool feeding devices in orbital movement, means for synchronizing the movement of said last mentioned tool feeding devices with the rotation of said center drive chucking devices, and common means for simultaneously feeding all of said tool feeding devices relative to said bearing portions of said crankshaft.

20. In a crankshaft lathe, a frame, center drive chucking mechanism mounted in said frame for supporting and rotating a crankshaft intermediate its ends, center means in said frame for supporting said crankshaft at its ends, tool feeding devices mounted on said frame for feeding appropriate tools for machining all of the line bearing portions of said crankshaft, a pair of master crankshafts mounted in said frame, means for rotating said crankshafts and said center drive chucking mechanism in synchronism, tool feeding devices mounted on the pins of said master crankshafts for feeding appropriate tools relative to all of the crank pins of said crankshaft, means for driving said center drive chucking mechanism and said master crankshafts, and means for simultaneously feeding all of said tool feeding devices relative to said bearing portions of said crankshaft.

21. In a crankshaft lathe, a frame, a plurality of center drive chucking devices axially spaced along a crankshaft in said lathe, center housings with centers located each side of said center drive chucking devices for supporting the ends of said crankshaft, tool feeding devices mounted on said frame for feeding appropriate tools to machine all of the line bearing portions of said crankshaft, said tool feeding devices being located between said center drive chucking devices and each side of said center drive chucking devices, a pair of master crankshafts rotatably mounted in said frame, means for rotating said master crankshafts and said center drive chucking devices in synchronism, tool feeding devices mounted on the throws of said master crankshafts for feeding appropriate tools relative to the crank pin portions of said crankshaft, said tool feeding devices also being located between said center drive chucking devices and each side of said devices, means for rotating said center drive chucking devices and master crankshafts, and common feeding means for simultaneously actuating all of said tool feeding devices.

22. In a crankshaft lathe, means for supporting and rotating a crankshaft in said lathe, a tool feeding device adapted to feed a cutting tool relative to a line bearing portion of said crankshaft, a pair of master crankshafts rotatably mounted in said lathe, means for rotating said master crankshafts and said supporting and rotating means in synchronism, a tool feeding device mounted on the pins of said master crankshaft adapted to feed a cutting tool relative to a pin bearing portion of said crankshaft, means for simultaneously feeding both of said tool feeding devices relative to the crankshaft comprising a third feed crankshaft rotatably mounted in a cradle pivotally mounted about the axis of rotation of one of said first mentioned master crankshafts, means for rotating said third mentioned crankshaft in synchronism with said first mentioned master crankshafts, means connecting a line bearing portion of said third mentioned feed crankshaft to said tool feeding device for presenting a tool to said line bearing portion of the work crankshaft, and means connecting a pin bearing portion of said third feed crankshaft to the tool feeding device for presenting a cutting tool to said pin bearing portion of the work crankshaft, and means for rocking said cradle whereby said tool feeding devices simultaneously actuate their tools to and from said line bearing and pin bearing portions of said work crankshaft.

23. In a lathe, a base, housings mounted on each end of said base, centers in each of said housings, one or more center drive chuck units mounted on said base and located between said housings and said centers, center drive chucking mechanism rotatably mounted in said unit, tool carrier units mounted on said base between said centers, tool holders movable in said tool units, a master crankshaft mounted in said base, a second master crankshaft mounted in said housings and in said center drive units, synchronizing gearing interconnecting said center drive chucking devices and said master crankshafts, orbital tool carrier units mounted on the pins of said master crankshafts and located between said housings and said centers, means for rotating said center drive chucking devices and master crankshafts, and tool holders movably mounted in said orbital tool carrier units, and means for feeding said tool holders in all of said units.

24. In a lathe, a base, a pair of spaced housings mounted at the ends of said base, centers in said housings, a pair of center drive chuck units mounted on said base between said housings and centers, rotatable center drive chucking devices mounted in said units, line bearing tool units mounted on said base and located between said center drive chuck units and each side of said units, tie bars interconnecting said housings, said center drive chuck units, and said line bearing tool units, tool bars movably mounted in said line bearing tool units, a master crankshaft rotatably mounted in said base, a second master crankshaft rotatably mounted in said housings and said center drive chuck units, orbitally moving tool holder units mounted on the pins of said master crankshafts, tool bars movably mounted in said orbital tool units, means for rotating said center drive chucking devices and said master crankshafts in synchronism, and common means for simultaneously actuating all of said tool bars in said tool units.

25. In a lathe, a base, a pair of housings mounted at each end of said base, centers in said housings, a pair of center drive chuck units mounted on said base and located between said housings and centers, rotatable center drive chucking devices mounted in said units, line bearing tool units mounted on said base and located between and each side of said center drive chuck units, a pair of oppositely reciprocatable tool bars mounted in each of said line bearing tool units, a master crankshaft rotatably mounted in said base, a second master crankshaft rotatably mounted in said housings and said center drive units, synchronizing gearing interconnecting said center drive chucking devices and said master crankshafts orbital pin turning units mounted on the pins of said master crankshafts, oppositely reciprocatable tool bars mounted in said pin turning units, means for rotating said center drive chucking devices and master crankshafts, and common means for simultaneously reciprocating all of the tool bars in said line bearing tool units and said pin bearing tool units.

26. In a lathe, as set forth in claim 25 in which said common means for simultaneously feeding all of said tool bars comprises a third feed crankshaft journaled in a cradle pivotally mounted about the axis of rotation of one of said master crankshafts, means for swinging said cradle, means for synchronizing the rotation of said third feed crankshaft with said first mentioned master crankshafts and center drive chucking devices, interconnecting means between the line bearing portions of said third feed crankshaft and the tool bars in said line bearing tool units, and interconnecting means between the pin bearings of said third feed crankshaft and the tool bars in said orbitally moving pin turning units.

27. In a lathe, means for chucking and rotating a work piece, a pair of oppositely reciprocatable tool bars movable relative to a concentric portion on said work piece, a pair of oppositely reciprocatable tool bars adapted to be fed relative to an eccentric portion of said work piece, means for bodily actuating said second mentioned pair of bars in orbital movement, means for rotating said chucking and rotating means, and means for simultaneously actuating said tool bars so as to feed tools from opposite directions relative to said concentric and eccentric portions on said work piece.

28. In a lathe, a rotatable work holder, a pair of oppositely reciprocatable tool bars adapted to be fed relative to a concentric portion on said work piece, a second pair of oppositely reciprocatable tool bars adapted to be fed relative to an eccentric portion on said work piece, means for bodily moving said second mentioned pair of tool bars in orbital movement, means for rotating said work holder, and common means for simultaneously feeding both pairs of said tool bars relative to said concentric and eccentric portions on said work piece.

29. In a lathe, a rotatable work holder, a pair of oppositely reciprocatable tool bars adapted to be fed relative to a concentric portion of a workpiece in said work holder, a second pair of oppositely reciprocatable tool bars adapted to be fed relative to an eccentric portion of said work piece, means for bodily moving said second mentioned pair of tool bars in orbital movement, means for simultaneously feeding both pairs of said tool bars comprising a member movable relative to a work piece in said work holder and having a portion moving in orbital motion in synchronism with the orbital motion of said orbitally moving tool bars, and means for moving said last mentioned means.

30. In a lathe, a rotatable work holder, a pair of oppositely reciprocatable tool bars movable relative to a concentric portion of a work piece in said work holder, a second pair of oppositely reciprocatable tool bars movable relative to an eccentric portion of said work piece, means for bodily moving said second mentioned pair of tool bars comprising a pair of master crankshafts, synchronizing gearing interconnecting said master crankshafts with said work holder, and common means for simultaneously feeding both of said pairs of tool bars comprising a third feed crankshaft, means for swinging said third feed crankshaft about the axis of one of said master crankshafts, means for synchronizing the rotation of said third feed crankshaft with the said master crankshafts, means connecting a line bearing portion of said third feed crankshaft with the tool bars adapted to be fed relative to a concentric portion of said work piece and means for connecting a pin bearing portion of said third feed crankshaft with the tool bars adapted to be fed relative to an eccentric portion of said work piece, and means to cause swinging movement of said third feed crankshaft.

31. A method of machining all of the bearing portions of a crankshaft comprising the steps: (a) centering the ends of the rough forging or casting, (b) machining finished locating and chucking areas on the webs of said crankshaft, (c) placing said crankshaft so prepared in a center drive lathe, and (d) applying tools simultaneously to all of the line bearing and pin bearing portions of said crankshaft.

32. The method of machining all of the bearing portions of a crankshaft comprising the steps: (a) centering the ends of the rough forging or casting, (b) inserting said crankshaft so prepared in a center drive lathe, (c) chucking said crankshaft in said lathe by means of its webs, and (d) simultaneously applying cutting tools to all of the line bearings, including the flange and stub ends, and all of the pin bearings of said crankshaft to thereby complete all of the bearing portions of said crankshaft in a single operation.

33. The method of completely machining all of the bearing portions of a crankshaft comprising the steps: (a) centering the ends of the rough crankshaft forging or casting, (b) inserting said crankshaft so prepared in a center drive lathe, (c) chucking said crankshaft in said lathe by means of its webs, and (d) simultaneously applying cutting tools from opposite sides of each bearing portion of said crankshaft for machining all of the line bearing and pin bearing portions of said crankshaft, including the flange and stub ends, the cheeks of the webs adjacent said bearing portions, and the fillets associated with said bearing portions in a single operation.

34. A method of turning concentric and eccentric surfaces on a work piece comprising the steps of, (a) centering the ends of the work piece, (b) machining locating areas on said work piece intermediate of and relative to said centers, (c) chucking said work piece in a lathe by means of said prepared centers and locating areas, and (d) simultaneously applying cutting tools to said work piece to machine said concentric and eccentric surfaces.

35. In a machine tool, a rotary work holder, tool units, means for actuating some of said tool units in circular orbital movement in synchronism with the rotation of the work holder, tools on said units having feeding movements relative to said work holder, a feeding member movable relative to said tool unit oscillating means, and means interconnecting said feeding member and said tools to effect simultaneous feeding of said tools during relative movement of said feeding member.

36. In a machine tool, a rotary work holder, tool units, rotary means oscillating some of said units in synchronism with the rotation of the work holder, tools on the tool units having feeding movement relative to the work holder, a feeding member rocking on the axis of rotation of said tool unit oscillating means, levers operatively related to said tools, and pivotal linkage connections connecting said levers to said feeding member oscillating on and relatively to said feeding member in synchronism with said oscillating tool units.

37. In a machine tool, a rotary work holder, tool units, rotary means oscillating some of said tool units in synchronism with the rotation of the work holder, tools on said units having feeding movements relative to the work holder, a feeding member rocking on the axis of rotation of said tool unit oscillating means, fluid pressure actuated means rocking said feeding member, means operatively connecting said feeding member to said tools, comprising pivotal linkage connections on said feeding member, oscillating on said feeding member in synchronism with said tool unit oscillation and means for rendering said fluid pressure means operative.

38. In a machine tool, a rotatable work holder, tool units having tools movable relative to concentric portions of a work piece in said work holder, tool units having tools movable relative to eccentric portions of said work piece, means for actuating said last mentioned tool units in orbital movement in synchronism with the work holder rotation, a feeding member movable relative to said tool units, means interconnecting said member and said tools to effect proper feeding of said tools when said feeding member is moved.

39. In a machine tool, a rotatable work holder, tool units having tools movable relative to concentric portions of a work piece in said work holder, tool units having tools movable relative to eccentric portions of said work piece, means for actuating said last mentioned tool units in orbital movement in synchronism with the work holder rotation, a feed crankshaft movable relative to said tool units and rotatable in synchronism with said work holder, interconnecting means between the line bearing and pin bearing portions of said feed crankshaft and the respective tools for the concentric and eccentric portions of said work piece, and means for moving said feed crankshaft to effect a proper feeding of said tools.

WILLARD L. GROENE.